United States Patent [19]

Mills et al.

[11] Patent Number: 5,266,413

[45] Date of Patent: * Nov. 30, 1993

[54] COPOLYESTER/POLYAMIDE BLEND HAVING IMPROVED FLAVOR RETAINING PROPERTY AND CLARITY

[75] Inventors: David E. Mills, Kingsport; Steven L. Stafford, Gray, both of Tenn.

[73] Assignee: Eastman Kodak Company, Rochester, N.Y.

[ * ] Notice: The portion of the term of this patent subsequent to Nov. 2, 2010 has been disclaimed.

[21] Appl. No.: 885,083

[22] Filed: May 18, 1992

[51] Int. Cl.$^5$ .................. B32B 27/06; B32B 27/36
[52] U.S. Cl. ................... 428/480; 125/425; 128/502; 264/523
[58] Field of Search .......... 525/425; 428/480; 528/502; 264/523

[56] References Cited

U.S. PATENT DOCUMENTS 4,837,115  6/1989  Igarashi et al. .

FOREIGN PATENT DOCUMENTS 61-276852  12/1986  Japan .
62-51442    3/1987  Japan .
62-181336   8/1987  Japan .
62-257959  11/1987  Japan .

*Primary Examiner*—Morton Foelak
*Assistant Examiner*—Duc Truong
*Attorney, Agent, or Firm*—John D. Thallemer; William P. Heath, Jr.

[57] ABSTRACT

This invention relates to a copolyester/polyamide blend having an improved flavor retaining property and clarity. More particularly, the present invention relates to an essentially noncrystalline copolyester containing poly(ethylene terephthalate) units blended with a critical amount of a nonhydroxyfunctional polyamide. The use of a nonhydroxyfunctional polyamide in a critical amount reduces the concentration of acetaldehyde contained in the poly(ethylene terephthalate) copolyester, and thus, improves the storage property, flavor retaining property, and fragrance retaining property of a food or the like.

14 Claims, No Drawings

COPOLYESTER/POLYAMIDE BLEND HAVING IMPROVED FLAVOR RETAINING PROPERTY AND CLARITY

FIELD OF THE INVENTION

This invention relates to a copolyester/polyamide blend having an improved flavor retaining property and clarity. More particularly, the present invention relates to an essentially noncrystalline copolyester containing poly(ethylene terephthalate) units blended with a critical amount of a nonhydroxyfunctional polyamide. The use of a nonhydroxyfunctional polyamide in a critical amount reduces the concentration of acetaldehyde contained in the poly(ethylene terephthalate) copolyester, and thus, improves the storage property, flavor retaining property, and fragrance retaining property of a food or the like.

BACKGROUND OF THE INVENTION

Polyethylene terephthalate (PET) is widely used for the production of light weight plastic articles since PET is excellent in mechanical properties such as formability and creep resistance and can be biaxially molecularly oriented. However, during molding or extrusion processes, acetaldehyde is formed by thermal decomposition of the polyester or copolyester containing poly(ethylene terephthalate) units, and when the polyester or copolyester is formed into an article, the acetaldehyde in the article walls migrates into the contents of the article. Small amounts of acetaldehyde adversely affect the flavor retaining property of foods and beverages, and the fragrance retaining property of foods, beverages, cosmetics, and other package contents. For these reasons, it is desirable to minimize the migration of acetaldehyde into package contents.

Acetaldehyde content has been successfully reduced in crystalline PET compositions by solid stating. Solid stating PET not only decreases its acetaldehyde content but also decreases the tendency to form acetaldehyde. Absent solid stating, large amounts of polyamides are required to reduce the level of acetaldehyde to an acceptable range. Such large amounts of polyamides adversely effect the clarity of the polyester blend. Thus, PET which has been solid stated exhibits a much lower acetaldehyde content than PET which has not been solid stated and does not require large amounts of polyamides.

Crystalline PET can be solid stated since crystalline PET has a well defined melting point. In contrast, noncrystalline or amorphous copolyesters can not be solid stated since such copolyesters lack a definite crystal structure and a well defined melting point and thus melt during the solid stating process forming large agglomerates. As a result, noncrystalline copolyesters of PET exhibit higher levels of acetaldehyde than crystalline PET resins. Attempts to reduce the acetaldehyde levels to an acceptable amount in noncrystalline copolyesters by blending large amounts of polyamides produce haze.

The use of polyamides to increase the gas barrier properties in PET based resins is disclosed in U.S. Pat. No. 4,837,115, Japanese Patent Applications (KOKAI) Nos. 62-181336, 62-257959, 62-51442 and 61-276852, and copending commonly assigned U.S. Ser. No. 07/862,027.

U.S. Pat. No. 4,837,115 discloses a polyester/high molecular weight polyamide blend in Which the polyester is a crystalline polyester wherein at least 80 mole percent of the acid component is terephthalic acid and at least 80 mole percent of the diol component is ethylene glycol, and the polyamide is a fatty acid formed by polymerizing an unsaturated fatty acid with a diamine.

Japanese patent Application (KOKAI) No. 62-181336 discloses blending crystalline polyethylene terephthalate resins with up to 30 weight percent of commercial grade high molecular weight polyamide resin.

Japanese Patent Application (KOKAI) No. 62-257959 discloses blending crystalline polyethylene terephthalate resins with 0.1 to 15 weight percent of a high molecular weight polyamide or ethylene/vinyl alcohol copolymer.

Japanese Patent Application (KOKAI) No. 62-51442 discloses a multilayer container having an innermost layer composed of a blend of high molecular weight aliphatic polyamides with a crystalline PET whose acid component is at least 80 mole percent terephthalic acid and whose glycol component is at least 80 mole percent ethylene glycol.

Japanese patent Application (KOKAI) No. 61-276852 discloses blends of polyalkylene terephthalate and high molecular weight polyamides composed of dicarboxylic acid component units that must include saturated hydroxydicarboxylic acid component units.

Copending commonly assigned U.S. Ser. No. 07/862,027, filed Apr. 2, 1992, discloses a blend containing crystalline PET and a low molecular weight polyamide.

In contrast, the present inventor has unexpectedly discovered that nonhydroxyfunctional polyamides used in a critical range of 0.05 to 2.0 weight percent are effective in reducing residual acetaldehyde in essentially noncrystalline copolyesters containing poly(ethylene terephthalate) units without adversely effecting clarity.

SUMMARY OF THE INVENTION

It is therefore an object of the present invention to reduce residual acetaldehyde contained in poly(ethylene terephthalate) based copolyesters and improve the flavor retaining property and fragrance retaining property of a content in a vessel formed from these copolyesters.

Another object of the invention is to provide copolyester/polyamide blends which exhibit superior clarity and processes for preparing said blends.

A further object of the invention is to provide copolyester/polyamide blends which exhibit excellent mechanical properties such as impact resistance, stress crack resistance and heat resistance, and which display excellent melt flowability at the time of molding thereof, and to provide processes for preparing said blends.

These and other objects are accomplished herein by essentially noncrystalline poly(ethylene terephthalate) based copolyester compositions having improved flavor retaining properties, comprising:

(A) 98.0 to 99.95 weight percent of a copolyester which comprises (1) a dicarboxylic acid component comprising repeat units from at least 50 mole percent terephthalic acid; and (2) a diol component comprising repeat units from at least 50 mole percent ethylene glycol; based on 100 mole percent dicarboxylic acid and 100 mole percent diol, provided that there is at least 20 mole percent dicarboxylic acid or diol comonomers present in the copolyester; and (B) 2.0 to 0.05 weight percent of a nonhydroxyfunctional polyamide, wherein the combined weights of (A) and (B) total 100 percent.

DESCRIPTION OF THE INVENTION

Component (A) of the present invention is an essentially noncrystalline poly(ethylene terephthalate) copolyester. By "essentially noncrystalline", it is meant that the copolyester exhibits no, or only a trace of, crystallization or melting point as determined by differential scanning calorimetry (DSC). The essentially noncrystalline poly(ethylene terephthalate) copolyester is comprised of a dicarboxylic acid component containing repeat units from at least 50 mole percent terephthalic acid and a diol component containing repeat units from at least 50 mole percent ethylene glycol, based on 100 mole percent dicarboxylic acid and 100 mole percent diol, provided that there is at least 20 mole percent dicarboxylic acid or diol comonomers present in the copolyester. Thus, the poly(ethylene terephthalate) copolyester may contain dicarboxylic acid comonomers, diol comonomers or both.

Examples of dicarboxylic acid comonomers other than terephthalic acid or suitable synthetic equivalents are aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Specific examples of dicarboxylic acid comonomers to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. The use of the corresponding acid anhydrides, esters, and acid chlorides of these acids is included in the term "dicarboxylic acid".

Examples of diol comonomers other than ethylene glycol are cycloaliphatic diols preferably having 6 to 15 carbon atoms or aliphatic diols preferably having 3 to 8 carbon atoms. Specific examples of diol comonomers to be included with ethylene glycol are: 1,4-cyclohexanedimethanol, propane-1,3-diol, butane-1,4-diol, pentane 1,5-diol, hexane-1,6-diol, 3-methylpentanediol-(2,4), 2-methylpentanediol-(1,4), 2,2,4-trimethylpentane diol-(1,3), 2-ethylhexanediol-(1,3), 2,2-diethylpropane diol-(1,3), hexanediol-(1,3), 1,4-di-(hydroxyethoxy) benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like.

The poly(ethylene terephthalate) based copolyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

For the purposes of the present invention, the preferred comonomers are isophthalic acid, 1,4-cyclohexanedimethanol, and diethylene glycol. The most preferred copolyester composition contains a dicarboxylic acid component which consists essentially of repeat units from terephthalic acid and a diol component which consists essentially of repeat units from 60 to 75 mole percent ethylene glycol and 25 to 40 mole percent 1,4-cyclohexanedimethanol.

Copolyesters useful as component (A) have an inherent viscosity of about 0.4 to about 1.5 dL/g. Preferably, the copolyesters have an inherent viscosity of 0.5 to 1.2 dL/g.

The copolyesters of the present invention can be prepared by conventional polycondensation procedures well known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diols at elevated temperatures in the presence of a catalyst.

The second component of the present invention is a nonhydroxyfunctional polyamide. The composition of the polyamide is not very critical with respect to decreasing acetaldehyde. However, some polyamides perform better with regard to clarity and dispersability. The following polyamides can be used in this invention, poly(m-xylylene adipamide), poly(hexamethylene adipamide), polycaprolactam, poly(hexamethylene isophthalamide), and poly(hexamethylene isophthalamide-co-terephthalamide). Additionally polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The polyamides may also contain small amounts of trifunctional or tetrafunctional comonomers such as trimellitic anhydride, pyromellitic dianhydride, or other polyamide forming polyacids and polyamines known in the art. The low molecular weight partially aromatic polyamides, however, are preferred over the aliphatic polyamides where clarity and dispersibility are crucial.

Preferred polyamides for use in the present invention are poly(m-xylylene adipamide), poly(hexamethylene adipamide), polycaprolactam, poly(hexamethylene isophthalamide), poly(hexamethylene adipamide-co-isophthalamide), poly(hexamethylene adipamide-co-terephthalamide), and poly(hexamethylene isophthalamide-co-terephthalamide). The most preferred polyamide is poly(m-xylylene adipamide).

The preferred polyamides are low molecular weight partially aromatic polyamides having a number average molecular weight of less than 15,000 and low molecular weight aliphatic polyamides having a number average molecular weight of less than 7,000. Combinations of such polyamides are also included within the scope of the invention. By "partially aromatic polyamide" it is meant that the amide linkage of the partially aromatic polyamide contains at least one aromatic ring and a nonaromatic species. The partially aromatic polyamides have an I.V. of less than 0.8 dL/g. Preferably the I.V. of the partially aromatic polyamides is less than 0.7 dL/g and the number average molecular weight is less than 12,000. The aliphatic polyamides have an I.V. of less than 1.1 dL/g. Preferably the I.V. of the aliphatic polyamides is less than 0.8 dL/g and the number average molecular weight is less than 6,000. The most preferred polyamide is poly(m-xylylene adipamide) having an inherent viscosity in 60/40 phenol/tetrachloroethane of 0.2 to 0.4 dL/g.

The polyamides are generally prepared by melt phase polymerization from a diacid diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80° to 120° C., until the ester is converted to amide. The mixture is then heated to the polymerization temperature. In the case of polycaprolactam, either caprolactam or 6-aminocaproic acid can be used as starting materials. When the diacid-diamine complex is used, the mixture is heated to melting and stirred until equilibration. The molecular weight is controlled by the diacid/diamine ratio. It is preferable to use an excess of diamine rather than excess diacid. This produces a higher concentration of terminal amino groups which are available to react with acetaldehyde. If the diacid diamine complex is prepared in a separate step, excess diamine is added prior to the polymerization. The polymerization can be carried out either at atmospheric pressure or at elevated pressures, depending on the particular polyamide composition.

The composition or articles of the present invention may contain up to about two weight percent of the polyamides and preferably less than one weight percent. Most preferably, the copolyester/polyamide blends of the present invention contain 0.1 to 0.5 weight percent of a polyamide. It has been determined that the use of polyamides at greater than about two weight percent based on the weight of the copolyester cause undesirable levels of haze and color.

The process for preparing the copolyester/polyamide blends of the present invention involve preparing the copolyester and polyamide, respectively, by processes as mentioned previously. The copolyester and polyamide are dried in an atmosphere of dried air or dried nitrogen, or under reduced pressure. The copolyester and polyamide are mixed and subsequently melt compounded, for example, in a single or twin screw extruder. Melt temperatures must be at least as high as the melting point of the copolyester and are typically in the range of 260°-310° C. Preferably, the melt compounding temperature is maintained as low as possible within said range. After completion of the melt compounding, the extrudate is withdrawn in strand form, and recovered according to the usual way such as cutting. Instead of melt compounding, the polyester and polyamide may be dry-blended and heat molded or draw formed into plastic articles.

The polyamide can be added in the late stages of polyester manufacture. For example, the polyamide can be blended with the molten polyester as it is removed from the polycondensation reactor, before it is pelletized.

The blends of this invention serve as excellent starting materials for the production of moldings of all types by extrusion or injection molding. Specific applications include various packaging applications such as thermoformed or injection molded trays, lids and cups; injection stretch blow molded bottles, film and sheet; extrusion blow molded bottles and multilayer articles. Examples of package contents include, but are not limited to, food, beverages, and cosmetics.

Many other ingredients can be added to the compositions of the present invention to enhance the performance properties of the blends. For example, impact modifiers, surface lubricants, denesting agents, stabilizers, antioxidants, ultraviolet light absorbing agents, metal deactivators, colorants such as titanium dioxide and carbon black, phosphate stabilizers, fillers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

In applications where a clear, colorless resin is desired, the slight yellow color generated during processing can be masked by addition of a blue dye. The colorant can be added to either component of the blend during polymerization or added directly to the blend during compounding. If added during blending, the colorant can be added either in pure form or as a concentrate. The amount of a colorant depends on its absorptivity and the desired color for the particular application. A preferred colorant is 1-cyano-6-(4-(2-hydroxyethyl) anilino)-3-methyl-3H-dibenzo(F,I,J)-isoquinoline-2,7-dione used in an amount of from about 2 to about 15 ppm.

Desirable additives also include impact modifiers and antioxidants. Examples of typical commercially available impact modifiers well known in the art and useful in this invention include ethylene/propylene terpolymers, styrene based block copolymers, and various acrylic core/shell type impact modifiers. The impact modifiers may be used in conventional amounts from 0.1 to 25 weight percent of the overall composition and preferably in amounts from 0.1 to 10 weight percent of the composition. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

The materials and testing procedures used for the results shown herein are as follows:

Copolyester consisted of about 100 mole percent terephthalic acid, and about 65 to 70 mole percent ethylene glycol and about 35 to 30 mole percent 1,4-cyclohexanedimethanol.

Acetaldehyde generation (AA Gen) was determined by the following method. The pelletized polyester was dried for 16 hours at 70° C. in a vacuum oven. A Tinius-Olsen melt indexer was loaded With 5 grams of the copolyester and held at the test temperature for five minutes. The molten polyester was extruded into water and stored at a temperature of −25° C. until grinding. The sample was ground to 20 mesh or finer and 0.5 grams was placed in a sample tube which was immediately sealed. The sample was analyzed by dynamic headspace gas chromatographic analysis using a Hewlett-Packard 5890 Gas Chromatograph with a Perkin Elmer Automatic Thermal Desorption ATD-50 as the injection system. Acetaldehyde was desorbed by heating the sample at 60° C. for ten minutes. This desorption procedure was repeated three times. The reported acetaldehyde concentrations are the sum of four 10 minute desorption cycles at 60° C. The gas chromatography column had a 30 m by 0.53 mm inside diameter.

Inherent viscosity (I.V.) was measured at 25° C. using 0.50 grams of polymer per 100 ml of a solvent consisting of 60% by weight phenol and 40% by weight tetrachloroethane.

Number average molecular weights of the polyamides were determined by ebulliometry using hexafluoroisopropanol.

The invention will be further illustrated by a consideration of the following examples, which are intended to be exemplary of the invention. All parts and percentages in the examples are on a weight basis unless otherwise stated.

EXAMPLE 1

Poly(m-xylylene adipamide) was prepared by the following procedure.

A mixture containing 43.8 grams of adipic acid, 53.04 grams of m-xylylenediamine (30% molar excess) and 50.0 grams of water, was prepared. The mixture was placed in a 500 mL flask under a nitrogen atmosphere. The mixture was heated with stirring to reflux for 20-30 minutes. Water was distilled off and the temperature was increased to 275° C. over a period of 30 minutes. The mixture was stirred at 275° C. for 30 minutes. Poly(m-xylylene adipamide) produced by this method had an I.V. of 0.20 dL/g.

Blends of the poly(m-xylylene adipamide) prepared above, with the Copolyester were prepared by the following procedure.

The polyamide was pulverized and subsequently dried at 120° C. for 24 hours in a vacuum oven. The Copolyester was dried for 16 hours at 60° C. in a ConAir drier. The polyamide powder was dry blended with the Copolyester pellets in concentrations of 0.1, and 1.0 weight percent. The blends were extruded and pelletized at a die temperature of 250° C. using a ¾ in. Brabender extruder fitted with a mixing screw. Acetaldehyde generated from the blends is summarized in Table I.

EXAMPLE 2

Poly(m-xylylene adipamide) was prepared by the following procedure.

A mixture containing 51.1 grams of adipic acid, 48.8 grams of m-xylylenediamine and 60.0 grams of water, was prepared. The mixture was placed in a 500 mL flask under a nitrogen atmosphere. The mixture was heated with stirring to reflux for 20-30 minutes. Water was distilled off and the temperature was increased to 275° C. over a period of 30 minutes. The pressure was reduced over a period of ten minutes to 0.25 torr. The mixture was stirred at 275° C. for 30 minutes. Poly(m-xylylene adipamide) produced by this method had an I.V. of 1.0 dL/g.

Blends of the poly(m-xylylene adipamide) prepared above, with the Copolyester were prepared by the following procedure.

The polyamide was pulverized and subsequently dried at 120° C. for 24 hours in a vacuum oven. The Copolyester Was dried in a ConAir drier for 16 hours at 60° C. The polyamide powder was dry blended with the Copolyester pellets in concentrations of 0.1 and 1.0 weight percent. The blends were extruded and pelletized at a die temperature of 250° C. using a ¾ in. Brabender extruder fitted with a mixing screw. Acetaldehyde generated from the blends is summarized in Table I.

EXAMPLE 3

Commercial grade poly(caprolactam), Nylon-6, having an I.V. of 1.4 dL/g Was used to prepare blends with the Copolyester. The polyamide was pulverized and subsequently dried at 120° C. for 24 hours in a vacuum oven. The Copolyester was dried in a ConAir drier for 16 hours at 60° C. The polyamide powder was dry blended with the Copolyester pellets in a concentration of 1.0 weight percent. The blends were extruded and pelletized at a die temperature of 250° C. using a ¾ in. Brabender extruder fitted with a mixing screw. Acetaldehyde generated from the blends is summarized in Table I.

EXAMPLE 4

Commercial molding grade poly(hexamethylene adipamide) having an I.V. of 1.3 dL/g was used to prepare blends with the Copolyester. The polyamide was pulverized and subsequently dried at 120° C. for 24 hours in a vacuum oven. The Copolyester was dried in a ConAir drier for 16 hours at 60° C. The polyamide powder was dry blended with the Copolyester pellets in a concentration of 1.0 weight percent. The blends were extruded and pelletized at a die temperature of 250° C. using a ¾ in. Brabender extruder fitted with a mixing screw. Acetaldehyde generated from the blends is summarized in Table I.

EXAMPLE 5

Selar PA polyamide available from E.I. DuPont deNemours & Company, Wilmington, Del., having an I.V. of 0.74, Was pulverized and dried at 120° C. for 48 hours in a vacuum oven. The Copolyester was dried in a ConAir drier for 16 hours at 60° C. The polyamide powder was dry blended with the Copolyester pellets in a concentration of 1.0 weight percent. The blends were extruded and pelletized at a die temperature of 250° C. using a ¾ in. Brabender extruder fitted with a mixing screw. Acetaldehyde generated from the blends is summarized in Table I.

EXAMPLE 6

MXD6 polyamide available from Mitsubishi Gas Chemical Company, Japan, Grade #6001 having an I.V. of 0.85, was pulverized and dried at 120° C. for 48 hours in a vacuum oven. The Copolyester was dried in a ConAir drier for 16 hours at 60° C. The polyamide powder was dry blended with the Copolyester pellets in concentrations of 0.25, 0.5, 1.0, 2.0 and 4.0 weight percent. The blends were extruded and pelletized at a die temperature of 275° C. using a ¾ in. Brabender extruder fitted with a mixing screw. Acetaldehyde generated from the blends is summarized in Table I.

TABLE I

| | Acetaldehyde Generation | | | |
|---|---|---|---|---|
| Example | Polyamide | I.V. (dL/g) | Polyamide (Wt %) | AA Gen 215° C. (ppm) | AA Gen 245° C. (ppm) |
| 1 | m-xylylene adipamide | 0.2 | 0 | 12.6 | 12.0 |
| | | | 0.1 | 2.1 | 2.7 |
| | | | 1.0 | 0.3 | 0.3 |
| 2 | m-xylylene adipamide | 1.0 | 0 | 12.6 | 12.0 |
| | | | 0.1 | 9.9 | 9.2 |
| | | | 1.0 | 5.3 | 4.7 |
| 3 | caprolactam | 1.4 | 0 | 12.6 | 12.0 |
| | | | 1.0 | 4.7 | 4.1 |
| 4 | hexamethylene adipamide | 1.3 | 0 | 12.6 | — |
| | | | 1.0 | 3.5 | — |
| 5 | Selar PA | 0.74 | 0 | 12.6 | — |
| | | | 1.0 | 5.3 | — |
| 6 | MXD6 | 0.85 | 0 | 9.5 | 11.3 |
| | | | 0.25 | — | 7.6 |
| | | | 0.5 | 6.0 | 5.2 |
| | | | 1.0 | 2.1 | 3.0 |

TABLE I-continued

| Example | Polyamide | I.V. (dL/g) | Polyamide (Wt %) | AA Gen 215° C. (ppm) | AA Gen 245° C. (ppm) |
|---|---|---|---|---|---|
| | | | 2.0 | 2.1 | 1.6 |
| | | | 4.0 | 1.4 | 1.7 |

The results in Table I illustrate that the nonhydroxyfunctional polyamides of the present invention used in a critical amount are effective in reducing the concentration of acetaldehyde in essentially noncrystalline copolyesters containing poly(ethylene terephthalate) units. Moreover, the lower molecular weight polyamides are more effective in reducing the concentration of acetaldehyde in copolyesters containing poly(ethylene terephthalate) units than high molecular weight polyamides and are thus preferred.

Many variations will suggest themselves to those skilled in this art in light of the above detailed description. All such obvious modifications are within the full intended scope of the appended claims.

What is claimed is:

1. An essentially noncrystalline copolyester composition having an improved flavor retaining property comprising:
   (A) 98.0 to 99.95 weight percent of a copolyester which comprises
      (1) a dicarboxylic acid component comprising repeat units from at least 50 mole percent terephthalic acid; and
      (2) a diol component comprising repeat units from at least 50 mole percent ethylene glycol; based on 100 mole percent dicarboxylic acid and 100 mole percent diol, provided that there is at least 20 mole percent dicarboxylic acid or diol comonomers present in the copolyester; and
   (B) 2.0 to 0.05 weight percent of a nonhydroxyfunctional polyamide, wherein the combined weights of (A) and (B) total 100 percent.

2. An essentially noncrystalline copolyester composition having an improved flavor retaining property comprising:
   (A) 98.0 to 99.95 weight percent of a copolyester which comprises
      (1) a dicarboxylic acid component comprising repeat units from at least 50 mole percent terephthalic acid; and
      (2) a diol component comprising repeat units from at least 50 mole percent ethylene glycol; based on 100 mole percent dicarboxylic acid and 100 mole percent diol, provided that there is at least 20 mole percent dicarboxylic acid or diol comonomers present in the copolyester; and
   (B) 2.0 to 0.05 weight percent of a low molecular weight nonhydroxyfunctional polyamide selected from the group consisting of low molecular weight partially aromatic nonhydroxyfunctional polyamides having a number average molecular weight of less than 15,000, low molecular weight aliphatic nonhydroxyfunctional polyamides having a number average molecular weight of less than 7,000, and combinations thereof, wherein the combined weights of (A) and (B) total 100 percent.

3. A heat molded or draw formed plastic article composed of an essentially noncrystalline copolyester composition comprising:
   (A) 98.0 to 99.95 weight percent of a copolyester which comprises
      (1) a dicarboxylic acid component comprising repeat units from at least 50 mole percent terephthalic acid; and
      (2) a diol component comprising repeat units from at least 50 mole percent ethylene glycol; based on 100 mole percent dicarboxylic acid and 100 mole percent diol, provided that there is at least 20 mole percent dicarboxylic acid or diol comonomers present in the copolyester; and
   (B) 2.0 to 0.05 weight percent of a nonhydroxyfunctional polyamide, wherein the combined weights of (A) and (B) total 100 percent.

4. A heat molded or draw formed plastic article composed of an essentially noncrystalline copolyester composition comprising:
   (A) 98.0 to 99.95 weight percent of a copolyester which comprises
      (1) a dicarboxylic acid component comprising repeat units from at least 50 mole percent terephthalic acid; and
      (2) a diol component comprising repeat units from at least 50 mole percent ethylene glycol; based on 100 mole percent dicarboxylic acid and 100 mole percent diol, provided that there is at least 20 mole percent dicarboxylic acid or diol comonomers present in the copolyester; and
   (B) 2.0 to 0.05 weight percent of a low molecular weight nonhydroxyfunctional polyamide selected from the group consisting of low molecular weight partially aromatic nonhydroxyfunctional polyamides having a number average molecular weight of less than 15,000, low molecular weight aliphatic nonhydroxyfunctional polyamides having a number average molecular weight of less than 7,000, and combinations thereof, wherein the combined weights of (A) and (B) total 100 percent.

5. The copolyester according to claim 1 wherein the dicarboxylic acid component consists essentially of repeat units from terephthalic acid and the diol component consists essentially of repeat units from 60 to 75 mole percent ethylene glycol and 25 to 40 mole percent 1,4-cyclohexanedimethanol.

6. The article according to claim 3 wherein the dicarboxylic acid component consists essentially of repeat units from terephthalic acid and the diol component consists essentially of repeat units from 60 to 75 mole percent ethylene glycol and 25 to 40 mole percent 1,4-cyclohexanedimethanol.

7. The composition according to claim 1 wherein the nonhydroxyfunctional polyamide is selected from the group consisting of poly(m-xylylene adipamide), poly(hexamethylene adipamide), polycaprolactam, poly(hexamethylene isophthalamide), poly(hexamethylene adipamide-co-isophthalamide), poly(hexamethylene adipamide-co-terephthalamide), and poly(hexamethylene isophthalamide-co-terephthalamide).

8. The composition according to claim 7 wherein the nonhydroxyfunctional polyamide is poly(m-xylylene adipamide).

9. The composition according to claim 2 wherein the low molecular weight partially aromatic nonhydroxyfunctional polyamide is selected from the group consisting of poly(m-xylylene adipamide), poly(hexamethylene isophthalamide), poly(hexamethylene adipamide-co-isophthalamide), poly(hexamethylene adipamide-coterephthalamide), and poly(hexamethylene isophthalamide-co-terephthalamide).

10. The composition according to claim 9 wherein the low molecular weight partially aromatic nonhydroxyfunctional polyamide is poly(m-xylylene adipamide).

11. The composition according to claim 2 wherein the low molecular weight aliphatic nonhydroxyfunctional polyamide is selected from the group consisting of poly(hexamethylene adipamide) and poly(caprolactam).

12. The composition according to claim 11 wherein the low molecular Weight aliphatic nonhydroxyfunctional polyamide is poly(hexamethylene adipamide).

13. The composition according to claim 1 further comprising an additive selected from the group consisting of impact modifiers, surface lubricants, denesting agents, stabilizers, antioxidants, ultraviolet light absorbing agents, metal deactivators, colorants, phosphate stabilizers and fillers.

14. The article according to claim 3 further comprising an additive selected from the group consisting of crystallization aids, impact modifiers, surface lubricants, denesting agents, stablizers, antioxidants, ulraviolet light absorbing agents, metal deactivators, colorants, phosphate stabilizers and fillers.

* * * * *